June 9, 1942.　　　F. H. LEAVITT　　　2,285,932
PROCESS FOR SOIL FERTILIZATION
Filed July 26, 1939
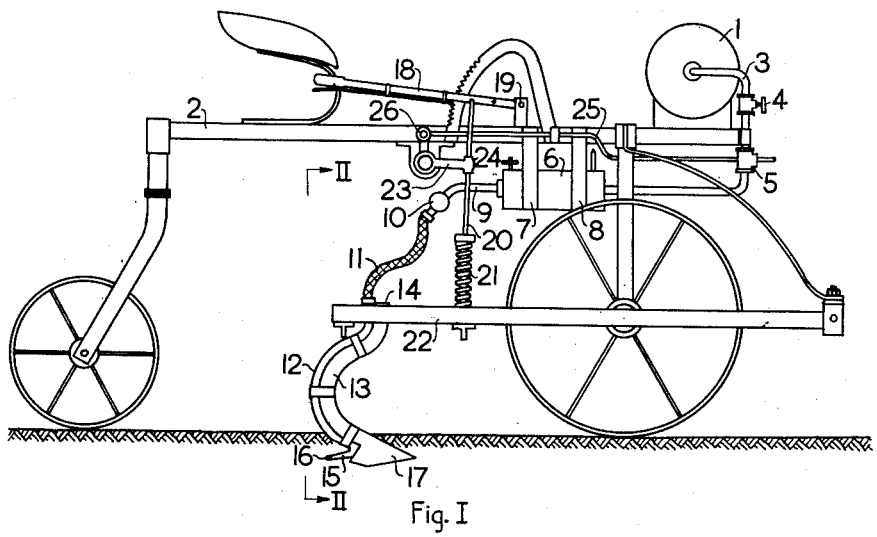
Fig. I
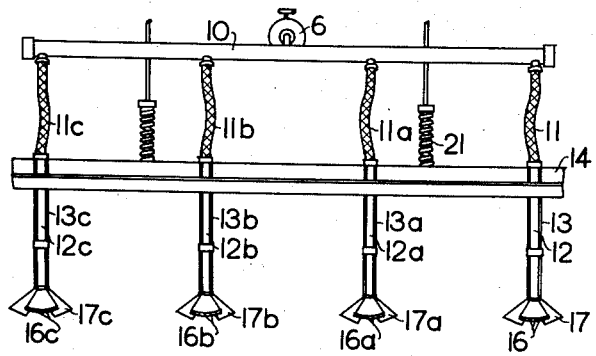
Fig. II
Inventor: Floyd H. Leavitt
By his Attorney: H. Birch Patented June 9, 1942

2,285,932

UNITED STATES PATENT OFFICE 2,285,932

PROCESS FOR SOIL FERTILIZATION

Floyd H. Leavitt, Burlingame, Calif., assignor to Shell Development Company, San Francisco, Calif., a corporation of Delaware Application July 26, 1939, Serial No. 286,569

6 Claims. (Cl. 47—58)

This invention relates to a method for supplying fixed nitrogen to soils deficient in this necessary growth element.

It has long been recognized that the fertilizer element most frequently lacking, and the one which must be supplied in the largest amounts, is nitrogen. Only a few species of plants are able to utilize the abundant nitrogen present in the earth's atmosphere, the remainder must obtain their supply of nitrogen from the soil. Potassium compounds, phosphates, calcium compounds and numerous other necessary compounds are present in soils in insoluble form but are slowly made soluble by the action of air and water, and more particularly by the action of the plant roots. In this respect the supply of nitrogen differs radically from that of the other elements utilized as plant food. When nitrogen is present in organic, insoluble compounds such as dried blood, tankage or manure, it must first be converted by bacterial action, independently of plant root action, into soluble nitrates which may be taken up by the roots. These soluble nitrogen compounds suitable for absorption by plant roots are, unfortunately, subject to dissipation because of their soluble nature by leaching and erosion.

In the past the necessary fixed nitrogen has been supplied to vegetation as nitrates and ammonium salts, and more recently as aqua ammonia in irrigation water. In the case of the ammonium salts, such as ammonium sulphate, repeated applications sometimes have the undesirable effect of producing an acid condition in the soil, due to the acid radical contained in the salts. Similarly, an equally undesirable alkali condition may result from extensive use of such nitrogen compounds as sodium nitrate.

An object of this invention is to overcome these disadvantages.

A further object is to provide a cheaper and more efficient system for supplying fixed nitrogen to the soil, especially in areas where irrigation is not practiced.

In brief, the present invention contemplates the direct addition of anhydrous ammonia gas to the soil in controlled amounts as a supply of fixed nitrogen.

It is still another object of this invention to provide apparatus capable of applying anhydrous ammonia gas directly to the soil.

The advantages of free ammonia as a fixed nitrogen fertilizer are numerous. For example, the displacement of calcium and magnesium in the soil by ammonium sulphate is nearly twice that found with ammonia in equivalent concentrations. This is significant when consideration is given to the fact that the lime content of a soil may be seriously depleted in time if a larger amount is liberated to the soil solution than is required by the vegetation.

The nitrification of free ammonia in all soil types proceeds much more rapidly than in the case of ammonium compounds, as for instance the sulfate. The differences found are of large magnitude, it having been shown that the nitrification of free ammonia takes place nearly quantitively. Free ammonia is adsorbed very readily by all soils and is fixed so strongly that subsequent leaching with water does not remove it from the soil. In this fixed condition ammonia is readily absorbed by vegetation and is with equal facility converted to nitrate nitrogen by bacterial action. Once converted into nitrate, the nitrogen of ammonia moves with ease both laterally and vertically in the soil with subsequent irrigation water or rain.

The accompanying drawing illustrates apparatus which may be used for this purpose.

Figure I illustrates, in side elevation, a conventional cultivator modified according to the present invention.

Figure II is a partial sectional view taken along the line II—II of Figure I.

In the figures, a cylinder 1 of liquefied anhydrous ammonia is mounted detachably upon the frame 2 of the cultivator. A conduit 3 leads from the ammonia cylinder through valves 4 and 5 to a flowmeter 6, also mounted upon frame 2 by means of brackets 7 and 8. A second conduit 9 leads from the flowmeter 6 to a manifold 10.

From the manifold 10, a plurality of flexible conduits 11, 11a, 11b and 11c lead to arcuated metal conduits 12, 12a, 12b and 12c fixedly mounted on the rear of tool-shanks 13, 13a, 13b and 13c which are in turn mounted on gang-bar 14. The metal conduits 12, 12a, 12b and 12c lead to fan-shaped nozzles 15, 15a, 15b and 15c having small outlet orifices therein at 16, 16a, 16b and 16c, mounted rigidly behind the cultivator shovels 17, 17a, 17b and 17c.

The lifting lever arrangement for controlling the depth under the ground surface at which the cultivator shoes travel, consisting of lever 18 pivoted at 19, link 20 attached to lever 18 and spring 21 attached to pendant 22, is further provided with automatic means for controlling the flow of ammonia gas. An L-link 23 is attached pivotably to link 20 at 24 and similarly to a rod 25 which operates valve 5. L-link 23 is in itself pivotably mounted on frame 2 at 26.

In operation, valve 4 is first opened and lever 18 then pushed to the desired position and locked in place, this position being determined by the depth at which it is desired to introduce the ammonia. The downward movement of lever 18 will also open valve 5 and permit passage of ammonia to flowmeter 6. The flowmeter is then adjusted to provide the desired rate of flow to manifold 10 and thence to conduits 11, 11a, 11b, 11c, 12, 12a, 12b, 12c and nozzles 15, 15a, 15b and 15c. Any of the standard available flowmeters are satisfactory for the present purpose, as for example the type described in U. S. Patent 2,038,511. When the end of a row is reached, or if for any other reason the shoes and attached nozzles are raised from beneath the soil surface, valve 5 will be closed and the supply of ammonia to the system shut off.

The depth beneath the ground surface at which the ammonia is introduced will depend upon several factors, as for example the pH of the soil, the moisture content, the quantity of ammonia to be applied, and the texture of the soil. It may vary from two inches to eighteen inches or more. Under average conditions, a depth of approximately six inches will be satisfactory. In any case the injection must be sufficiently deep to insure substantially complete adsorption of the ammonia introduced.

Obviously, similar apparatus may be attached to other agricultural equipment such as plows, seeders, bedders, etc.

The quantity of ammonia gas to be applied depends upon the crop, the general condition of the soil and the time of fertilization. Each local area has conditions which warrant slightly different rates of application, due to soil, water and climatic conditions, for identical crops. For purposes of illustration, however, it may be stated that the following rates of application have, on the average, given excellent results:

For small grain, such as barley, flax, oats, wheat and rye; from 30 to 50 pounds of ammonia per acre.

For fruit and nut crops; from 65 to 175 pounds of ammonia per acre.

For leguminous crops; from 40 to 90 pounds of ammonia per acre.

For vegetables; from 50 to 130 pounds of ammonia per acre.

The time of application of the ammonia will also depend upon the crop to be fertilized. For example, with pink beans it has been found preferable to apply the ammonia at that stage during which the beans just start to "runner." Application is preferably made to peach orchards in both the spring and fall of the year. It appears advisable to make all applications to sugar beets in the early stages of growth. In general it may be stated that the proper time of application can only be obtained by experimental means, as it may vary from seeding to maturity, from early spring to late fall, and may require one or several applications depending upon the vegetation concerned.

Acidic soils lend themselves particularly to fertilization according to the present invention as the presence of the hydrogen ions in such soils makes for more rapid and complete adsorption of the ammonia gas and obviates the necessity of deeper application as is necessary in soils having a pH of 7+.

The upper permissible limit for ammonia addition is a point just below that at which the ammonia concentration becomes high enough to burn the vegetation.

The advantages of free ammonia as a source of fixed nitrogen are well known. In the past, it has been possible to apply free ammonia only during irrigation. A large percentage of the land under cultivation, however, is unirrigated, and the principal advantage of the present invention is that these large areas of non-irrigated soil, in many cases those soils most deficient in fixed nitrogen, may now be easily, efficiently and economically supplied with this necessary element.

Another particular advantage of the present invention over existing methods of applying nitrogen-containing compounds to soils lies in the fact that a much more even distribution is obtainable. When fertilizers are distributed by spreading, there is some tendency for uneven adsorption in favor of the soil nearest the points of application. When ammonia gas is applied according to the present invention, an even distribution throughout the sub-surface of the soil is brought about. As the ammonia permeates the soil and rises, due to the fact its specific gravity is less than that of air, a much more even adsorption throughout the soil structure takes place.

I claim as my invention:

1. A method for supplying fixed nitrogen to soils comprising passing a gas consisting essentially of anhydrous ammonia directly into and under the surface of the soils at a depth of not less than approximately 2 inches and in amounts insufficient to cause burning of vegetation growing therein, said amounts being between approximately 30 and 175 pounds per acre.

2. A method for supplying fixed nitrogen to soil wherein grain crop is growing comprising passing a gas consisting essentially of anhydrous ammonia directly into and under the surface of said soil at a depth of not less than approximately 2 inches and in an amount insufficient to cause burning of said crop, said amount being between approximately 30 and 50 pounds per acre.

3. A method for supplying fixed nitrogen to soil wherein fruit crop is growing comprising passing a gas consisting essentially of anhydrous ammonia directly into and under the surface of said soil at a depth of not less than approximately 2 inches and in an amount insufficient to cause burning of said crop, said amount being between approximately 65 and 175 pounds per acre.

4. A method for supplying fixed nitrogen to soil wherein vegetable crop is growing, comprising passing a gas consisting essentially of anhydrous ammonia directly into and under the surface of said soil at a depth of not less than approximately 2 inches and in an amount insufficient to cause burning of said crop, said amount being between approximately 50 and 130 pounds per acre.

5. A method for supplying fixed nitrogen to soils comprising passing a fluid consisting essentially of anhydrous ammonia directly into and under the surface of soils at a depth of not less than approximately 2 inches and in amounts insufficient to cause burning of vegetation growing therein, said amounts being between approximately 30 and 175 pounds per acre.

6. In a method for supplying fixed nitrogen to soils the steps comprising passing a fluid consisting essentially of anhydrous ammonia from a pressurized supply source into an expansion zone and thereafter passing fluid, without further addition thereto, from said expansion zone into and under the surface of soils at a depth of not less than approximately 2 inches and in amounts insufficient to cause burning of vegetation growing therein, said amounts being between approximately 30 and 175 pounds per acre.

FLOYD H. LEAVITT.